Dec. 11, 1962 D. E. BREITHAUPT 3,067,965
FISHING REEL
Filed Aug. 12, 1960 3 Sheets-Sheet 1
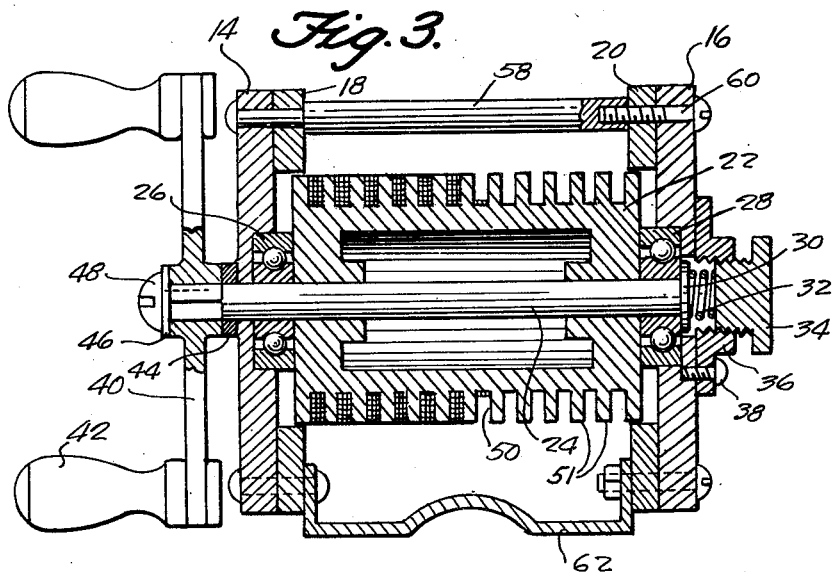
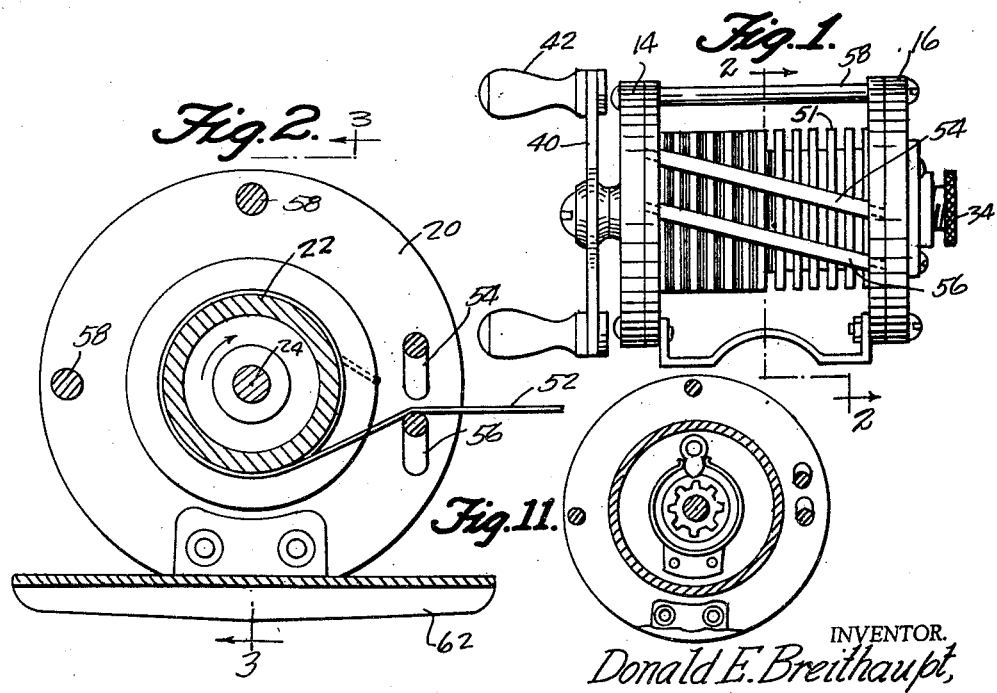
INVENTOR.
Donald E. Breithaupt,
BY
McMorrow, Berman & Davidson
ATTORNEYS Dec. 11, 1962     D. E. BREITHAUPT     3,067,965
FISHING REEL
Filed Aug. 12, 1960     3 Sheets-Sheet 2
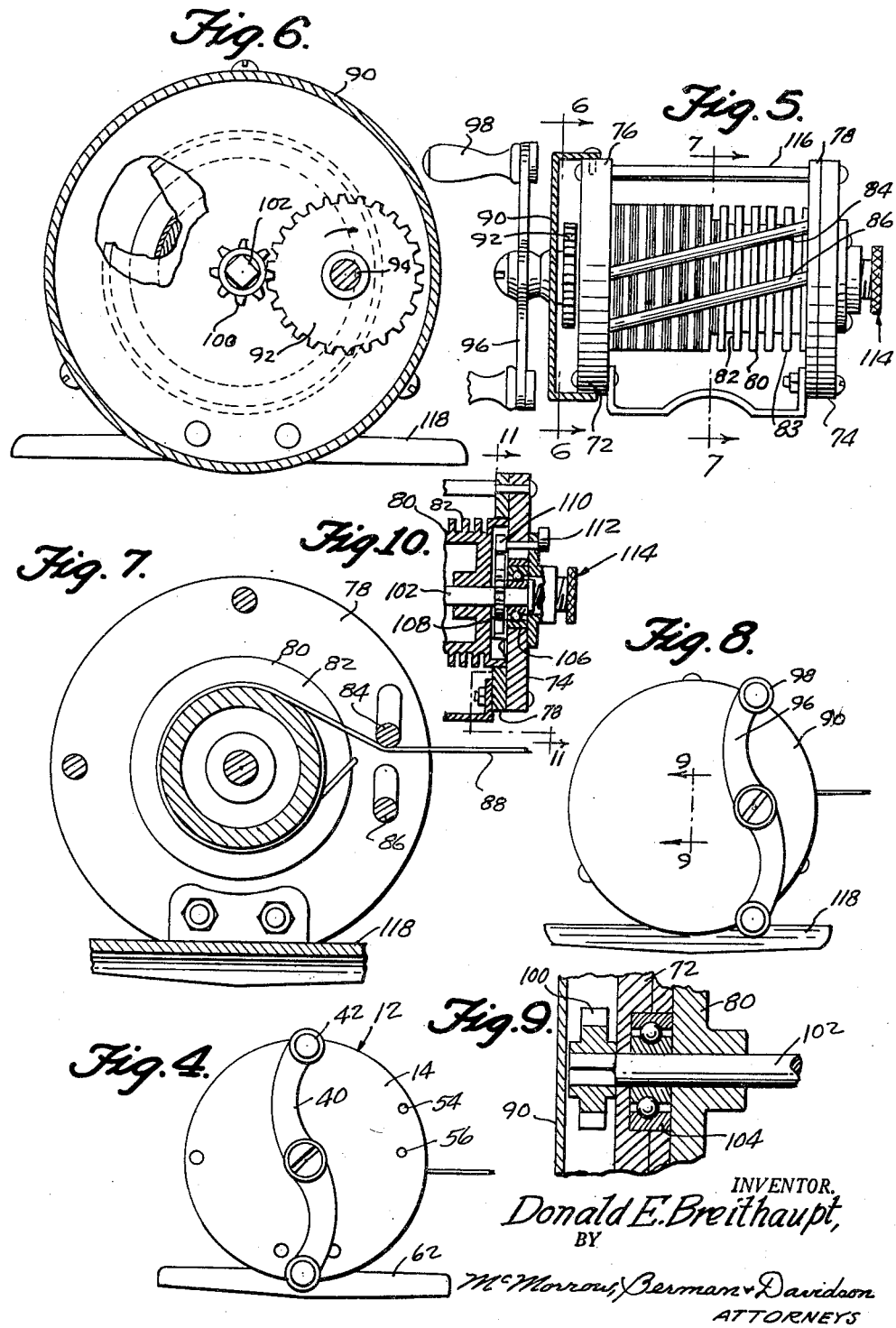

Dec. 11, 1962 D. E. BREITHAUPT 3,067,965
FISHING REEL
Filed Aug. 12, 1960 3 Sheets-Sheet 3
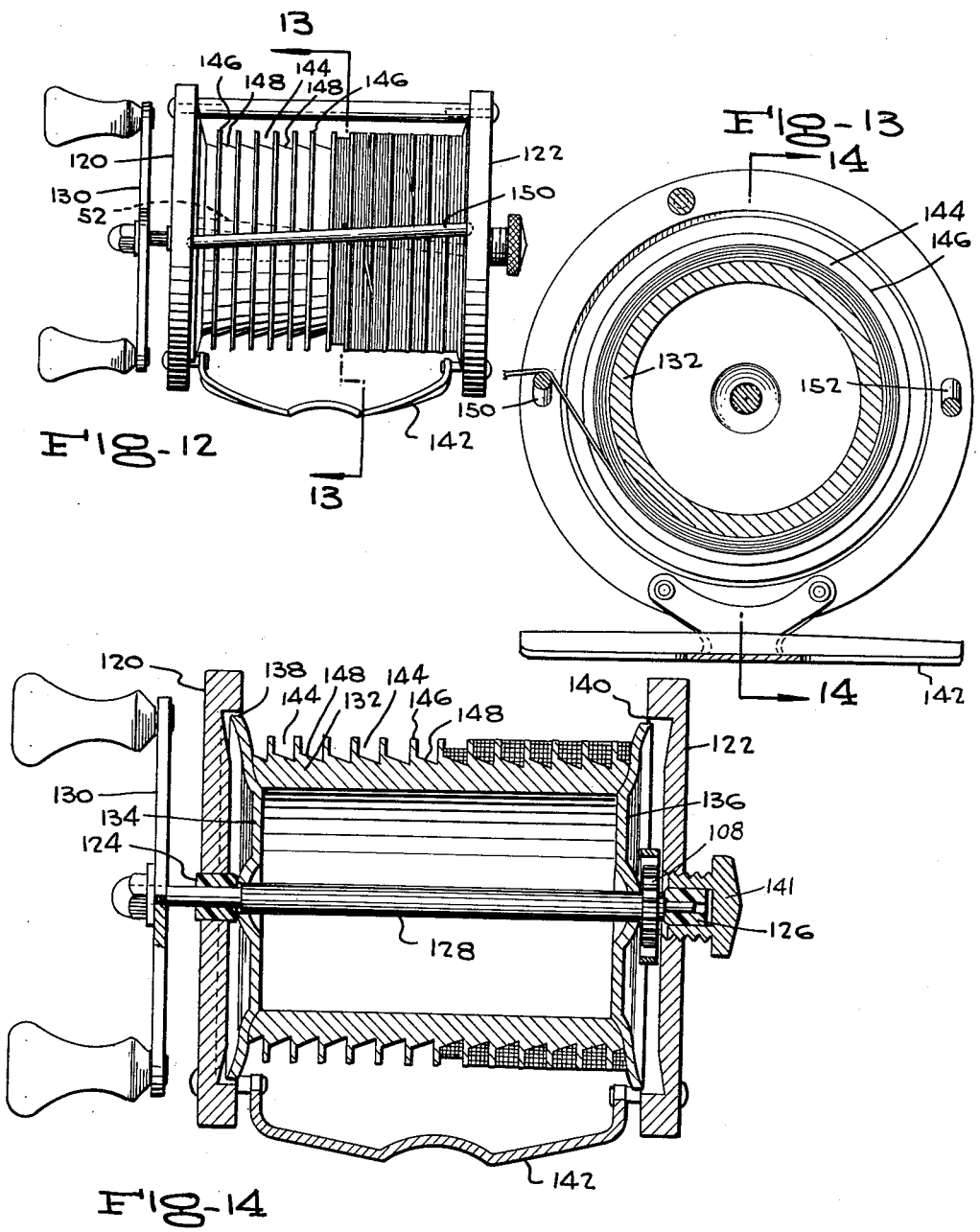
INVENTOR.
DONALD E. BREITHAUPT
BY
McMorrow, Berman & Davidson
ATTORNEYS

United States Patent Office 3,067,965
Patented Dec. 11, 1962

3,067,965
FISHING REEL
Donald E. Breithaupt, 1216 Comino Vega,
Farmington, N. Mex.
Filed Aug. 12, 1960, Ser. No. 49,392
4 Claims. (Cl. 242—84.4)

This is a continuation-in-part of my co-pending application, Serial No. 760,724 filed September 12, 1958, and now abandoned, substantially the entire subject matter of which is incorporated herein, with modified discussion, together with certain added features by way of improvement.

The basic fishing reel, operating on the principle of tangential reeling, is simply a spool journalled in a mounting which is clamped onto a fishing rod. The two main problems associated with this type of reel are concerned with backlash, or over-running of the line, and consequent snarls, on casting, and with level winding on the spool. The former has been given a measure of control in various ways, running from simple drag introduced by pressure of the thumb on the windings of the spool, which demands expertness, to units built into the mechanism by means of which frictional resistance to rotational speed may be regulated, and level-winding has been accomplished by elaborate systems wherein a line guide is caused to cyclically traverse the spool from end to end. These latter operate satisfactorily under ideal conditions, but are subject to being thrown out of phase from time to time, in which case their purpose is defeated in large measure.

I have found that these basic difficulties are satisfactorily resolved by a structural innovation in the spool itself, thus materially reducing the dependency on auxiliary units. In particular, and as already disclosed in the parent application hereto, and repeated hereinafter, a successful reel is achieved by the simple yet radical expedient of providing a series of distinct, annular, peripheral channels in the working surface of the spool, which are filled up step-wise in winding and payed out in similar manner.

In a very broad sense, this principle may be likened to what is known as "quantizing" in modern physics, which had its beginnings in the discovery that radiant energy is not continuous, but is released in distinct, indivisible bundles known as "quanta." That is to say, the reeling in either direction, goes through periodic cycles of action, each of which may be viewed as successive reeling operations on a series of small spools, these miniature spools being arranged in side-by-side relation, and the entire operation involving only one excursion or traverse of the line across the spool as a whole.

It is therefore an object of the invention to minimize over-running backlash and tangling, and to achieve improved level winding in fishing reels. Another object is to achieve the foregoing while minimizing dependence on auxiliary mechanisms. A particular object is to achieve level winding or payout in a system involving a single excursion of the line across the reel. Other objects include achieving periodicity in the reeling operation and improved functioning of conventional drag means.

These and other objects, which will be apparent to those skilled in the art, are attained by the present invention, certain preferred embodiments of which are described in the following specification, and illustrated in the drawings, in which:

FIGURE 1 is an elevational view of the fishing reel according to the present invention shown removed from a fishing rod and shown with a line partially wound thereon;

FIGURE 2 is a sectional view on an enlarged scale, taken on the line 2—2 of FIGURE 1;

FIGURE 3 is an axial sectional view taken on the line 3—3 of FIGURE 2;

FIGURE 4 is an end elevational view of the device in FIGURE 1 as seen from the left of that figure;

FIGURE 5 is a view similar to FIGURE 1 showing a modified form of the fishing reel;

FIGURE 6 is a sectional view on an enlarged scale, taken on the line 6—6 of FIGURE 5;

FIGURE 7 is a sectional view on an enlarged scale, taken on the line 7—7 of FIGURE 5;

FIGURE 8 is an end elevational view of the device of FIGURE 5 as seen from the left of that figure;

FIGURE 9 is a sectional view, on an enlarged scale, taken on the line 9—9 of FIGURE 8 and showing a detail;

FIGURE 10 is a partial axial sectional view of one end of the reel shown in FIGURES 5 to 8, inclusive;

FIGURE 11 is a sectional view taken on the line 11—11 of FIGURE 10;

FIGURE 12 is a side elevational view of another form of the fishing reel;

FIGURE 13 is an enlarged sectional view taken along the line 13—13 of FIGURE 12; and FIGURE 14 is a sectional view taken along the line 14—14 of FIGURE 13.

Referring in greater detail to the drawings in which like numerals indicate like parts throughout the several views, in FIGURES 1 to 4, inclusive, the reel of the present invention includes a frame 12 having end plates 14 and 16 and annular members 18 and 20 secured on the confronting faces of the end plates 14 and 16, respectively, the annular members 18 and 20 being of a size so as to loosely fit about the end portions of a reel spool 22.

The reel core or spool 22 is fixedly secured to a shaft 24 which has portions adjacent each end exteriorly of the spool 22 and journaled in bearing assemblies 26 and 28 which are seated in central recesses in the inner faces of the end plates 14 and 16, respectively.

The end of the shaft 24 adjacent the end plate 16 is provided with a head 30 of a size to partially overlie the inner race of the adjacent bearing assembly 28. One end of a coil spring 32 bears against the exterior face of the head 30 and the other end of the spring 32 is in bearing engagement with the inner face of a thumb screw 34 threaded in a threaded boss 36 secured by screws 38 to the exterior face of the end plate 16. The unit comprising shaft head 30, spring 32, thumb screw 34, boss 36 and screws 38 constitutes a drag for limiting the speed of rotation of the shaft 24 as it revolves when casting a line therefrom.

The other end of the shaft 24 projects outwardly of the end plate 14 and is provided with a double-ended crank 40 on the ends of which are handles 42, constituting hand actuable means for imparting rotary movement to the shaft 24.

Washers 44 and 46 are positioned on the shaft 24 on either side of the hub of the crank 40 and a cap bolt or screw 48 is threadedly received in a threaded bore provided in the end portion of the shaft 24 for securing the crank 40 to the shaft 24.

The reel spool 22 is provided with a plurality of annular channel grooves 50 about the periphery of the spool 22, and concentric with the axis thereof, and arranged in spaced relation from one end of the spool 22 to the other end. Each groove 50 is of a depth to receive a predetermined number of turns of a fishing line 52 when wound therein.

Guide means is provided for forming windings in the respective grooves on the spool 22. Specifically, this guide means embodies a pair of spaced bars 54, 56 arranged in a sloping direction and positioned so as to extend across the spool 22 with the ends of the bars anchored in the end plates 14 and 16 of the frame 12.

A plurality of spacer bars 58 having screws 60 extending into their end portions are used to separate the end plates 14 and 16 and the annular members 18 and 20 and to secure the frame 12 as a unitary structure. A connecting plate member 62 has its ends anchored in the end plates 14 and 16 and is adapted for attachment to a fishing rod.

Referring to FIGURES 5 to 11, inclusive, a modified form of the invention is shown in which the reel has a frame including end members 72 and 74 each having an annular member 76 and 78 fixedly secured to the inner face thereof and of a size to loosely encompass the end portions of a reel spool. The reel spool 80 is provided with annular channel grooves 82 extending completely therearound and from one end to the other of the spool 80 with the grooves 82 spaced from each other by partition walls 83 and each of a depth to receive a winding of a plurality of layers of a fishing line superimposed upon each other, the layers being of a predetermined depth determined by practice and use. Bars 84 and 86 are arranged in lateral spaced relation and slope upwardly from the end member 72 to the end member 74, as shown in FIGURE 5, and serve as guides for a fishing line 88 which is wound upon the spool 80 starting at the groove 82 adjacent one of the end members 72 or 74.

A cover 90 extends over the end member 72 and provides a cavity in which a gear 92 is journaled on a stub shaft 94 having its ends journaled in the end member 72 and extending outwardly of the cover 90, respectively, the outwardly extending end portion of the shaft 94 carrying a crank arm 96 having handles 98 at the ends thereof. The gear 92 is in mesh with a pinion gear 100 carried on the squared-off end portion of a shaft 102 which extends through the reel spool 80 and is keyed thereto.

The end portions of the shaft 102 are journaled in bearing assemblies 104 and 106 which are supported in the end members 72 and 74, respectively. Within the end portion of the reel spool 80 adjacent the annular member 78 (FIGURE 10) is a notched member or gear 108 fixedly secured to the adjacent portion of the shaft 102. A spring-mounted abutment member 110 is carried within the recessed portion of the spool 80 and is shiftable into and out of engagement with the gear 108 by means of an exteriorly located thumb button 112. This constitutes a "clicker" which, when in engagement with the gear 108, makes an audible clicking sound whenever the reel spool 80 is rotated. The construction of the "clicker" is conventional and need not be further described as it is not a part of the present invention. A drag assembly, designated generally by the reference numeral 114, is fixedly secured to the outer face of the end member 74 and is of the same construction as heretofore described with respect to the drag consisting in the shaft head 30, spring 32, thumb screw 34, and boss 36. The drag 114 operates in the same manner as heretofore described with reference to the first form of the invention illustrated in FIGURES 1 to 4, inclusive.

The end members 72 and 74 are connected together by spacing members or bars 116 and a support member 118 has its ends secured in the end members 72 and 74 and is adapted for attachment to a fishing rod.

It is intended that the drag and clicker assemblies be used with one or either of the reels as heretofore described, as such drag and clicker assemblies are of conventional construction for which no invention is claimed.

The only fundamental difference in the two forms shown is in the gearing, which controls the speed of wind-up, hence the ensuing discussion will be limited in reference to the form shown in FIGURES 1 to 3. A line of suitable diameter is anchored, as by tying in a tight loop, in the extreme leftward channel groove in the spool, and winding commenced, by clockwise rotation of the crank arms 40. Due to the depth of the groove, the line will remain within its confines, in spite of the slant of the guide rod 56 until the groove is filled by the line. During this loading process the line is so confined by the relatively small lateral dimension of the groove that any slight tendency to wander is constantly compensated, so that what amounts to level winding for all practical purposes is accomplished in the individual groove. After the groove is filled, however, the tendency of the line to wander is no longer under restraint, and due to the bias afforded by the slant of guide rod 56, movement of the line to the next empty groove is favored, with the result that the line "spills over" and take-up in the said next groove is commenced.

At this point, attention is directed to another and distinct mode of co-action between the slanted guide rod and the grooves. Making the reasonable assumption that the reel is being turned at a constant rate, the linear velocity of the line will gradually increase as the groove fills up, due to the gradual increase in effective diameter.

This mode of action presents an advantage in that, in reeling in a lure for instance, the periodicity of reel-in, with gradually increasing velocity and periodic, sudden drops to a minimum value, afford an illusion which has merit in fishing, and which is accomplished without conscious effort or direction by the fisherman.

Another feature of the system, which is particularly significant in casting, is the fact that the traverse of the reel by the line is accomplished in a single excursion, with step-wise motion in distinct steps, the minor wanderings of the line in the individual grooves, being minor in magnitude and therefore well under control.

The virtue of the system of grooves in relation to backlash control is also manifest in its cooperative relation to the adjustable drag means. In a conventional reel, the spool attains a fairly steady speed of rotation on casting, but varies gradually from a minimum to a maximum. Since the kinetic energy of the weight on the line tends to remain constant, the same is true of its linear velocity, and hence the angular velocity of the spool tends to increase as the line is payed out. This encourages overrunning and backlash, and is usually dealt with by a judicious application of varying thumb pressure. When the multiple grooves are employed, the linear velocity applied to the spool drops to a minimum value each time the line moves from the bottom of a groove to the top of the next groove. In the brief interval respite, there is a reduction in load, and the drag means operates to slow down the spool, thus automatically performing a function which would be accomplished by a periodic application of thumb pressure.

The form of the device shown in FIGURES 12 to 14 constitutes the subject matter herein added to that of the abovesaid parent application, the significant changes being in the shape of the grooves and the provision of an alternate, slant guide rod. The structure shown comprises a pair of circular end plates 120, 122 with central bushings 124, 126 journalling a crankshaft 128 having a double crank arm 130, and on which the spool 132 is axially mounted. For this mounting, the main, cylindrical body of the spool has circular end plates 134, 136 with outwardly dished, central bosses with circular openings received on the shaft 128 in pressed engagement, or otherwise keyed thereto. The outer edges of end plates 134, 136 are outwardly flared, and received in mating annular grooves 138, 140 in the periphery of circular recesses in the inner faces of mounting plates 120, 122 thus providing a guard against slipping of the line off the end of the spool. The clicking device at the right end of the shaft 128 is generally the same as that shown in FIGURE 10, and the drag adjustment is effected by means of a screw 141 having an axial cavity carrying the plastic bearing 126, which latter may be brought into frictional engagement with the click gear 108 upon turning of the screw. A plate 142, for attachment to a fishing rod, is secured to the mounting plates 120, 122.

The spool 132 has peripheral grooves 144 separated by thin annular partions 146 generally similar to the arrangement in FIGURES 1 and 5. However, in this case, the grooves have slanted bottoms 148. That is to say, each groove bottom, in its entirety about the periphery is frusto-conical in form. The guide rod 150 extending between and carried by mounting plates 120, 122, has a slant similar to the lower rods 56 and 86 of FIGURES 1 and 5, and this slant is arranged in an opposite sense to that of the groove bottoms 148. Diametrically opposite the guide rod 150 is a similar rod 152 with a slant angle opposite to that of rod 150, which will be employed if the assembly is turned about to accommodate a left-handed angler.

Since the line is intended to descend the slanted guide rod during wind-up, the end of the line will be secured in the extreme rightward groove in FIGURE 12, with wind-up proceeding to the left. If the angle of the rod 150 is reversed the wind-up will progress from left to right.

The slanted bottoms of the grooves perform several functions. For instance they provide a reverse camming action on the line after spill-over to prevent overshooting. In addition they initiate a pattern of level winding from right to left in each groove by an enforced pattern of behavior, which gradually relaxes. Also, in this form, even if a tangle should develop in an individual groove, which is unlikely, the trouble will not be evident to any appreciable depth in the groove.

While certain theories concerning the mode of operation have been presented herein, the merits of the invention do not depend upon their correctness, and these have been offered, in the spirit of the patent laws, merely in an attempt to explain facts of operation, which are inherent in the device, and which have been established in use.

Having thus described the invention, what I desire to claim by Letters Patent is:

1. A reel for winding a line in multiple layers comprising:
   (a) a mounting framework;
   (b) a spool journalled in the framework;
   (c) means to rotate the spool;
   (d) the spool having a plurality of individual, line receiving grooves therein, each having a bottom wall, the bottom walls of each groove being parallel and of a uniform maximum depth; and
   (e) a guide rod carried by the framework substantially co-extensive with the length of the spool and contiuously slated at a constant angle to the axis of rotation of the spool and to the bottom walls.

2. A reel as defined in claim 1 wherein:
   (a) the grooves are substantially identical to one another.

3. A reel as defined in claim 1 wherein:
   (a) said bottom walls are inclined with respect to the axis of rotation of the spool and oppositely to the inclination of the guide rod.

4. A reel for winding a line in multiple layers comprising:
   (a) a mounting framework;
   (b) a substantially cylindrical spool journalled for rotation in the framework;
   (c) means to rotate the spool;
   (d) the spool having a plurality of line receiving grooves therein, each having a bottom wall, the bottom walls being parallel, similarly inclined, and being of a uniform maximum depth;
   (e) the grooves being concentric with the axis of rotation of the spool; and
   (f) a guide rod carried by the framework on at least one side thereof substantially co-extensive with the length thereof, and consinuously slated at a constant angle to said axis and to said bottom walls.

References Cited in the file of this patent

UNITED STATES PATENTS

| | | |
|---|---|---|
| 1,172,418 | Wolfe | Feb. 22, 1916 |
| 1,552,038 | Comstock | Sept. 1, 1925 |
| 2,535,746 | Mitchell | Dec. 26, 1950 |
| 2,776,515 | Lynch | Jan. 8, 1957 |
| 2,855,163 | Powers | Oct. 7, 1958 |

UNITED STATES PATENT OFFICE
CERTIFICATE OF CORRECTION

Patent No. 3,067,965                      December 11, 1962

Donald E. Breithaupt

It is hereby certified that error appears in the above numbered patent requiring correction and that the said Letters Patent should read as corrected below.

Column 1, line 40, for "winding" read -- windup --; column 6, line 10, for "slated" read -- slanted --; line 33, for "consinuously slated" read -- continuously slanted --.

Signed and sealed this 30th day of April 1963.

(SEAL)

Attest:

ERNEST W. SWIDER
Attesting Officer

DAVID L. LADD
Commissioner of Patents